United States Patent
Balani et al.

(10) Patent No.: US 9,218,197 B2
(45) Date of Patent: Dec. 22, 2015

(54) VIRTUAL MACHINE IMAGE MIGRATION

(71) Applicant: International Business Machines Corporation, Armonk, NY (US)

(72) Inventors: Rahul Balani, New Delhi (IN); Dipyaman Banerjee, New Delhi (IN); Kamal Kumar Bhattacharya, Bangalore (IN); Deepak Kumar Jeswani, New Delhi (IN); Aritra Sen, New Delhi (IN); Akshat Verma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 13/690,297

(22) Filed: Nov. 30, 2012

(65) Prior Publication Data

US 2014/0157260 A1    Jun. 5, 2014

(51) Int. Cl.
   *G06F 9/46* (2006.01)
   *G06F 9/445* (2006.01)
   *G06F 9/455* (2006.01)

(52) U.S. Cl.
   CPC .............. *G06F 9/45558* (2013.01); *G06F 8/61* (2013.01); *G06F 9/45533* (2013.01); *G06F 2009/4557* (2013.01)

(58) Field of Classification Search
   CPC .... G06F 9/45533; G06F 8/61; G06F 9/45558
   USPC ........................................................ 717/178
   See application file for complete search history.

(56) References Cited

U.S. PATENT DOCUMENTS

| 7,136,974 | B2 * | 11/2006 | Burton et al. ................. 711/162 |
| 8,108,456 | B2 | 1/2012 | Chen et al. |
| 2012/0054731 | A1 | 3/2012 | Aravamudan et al. |
| 2012/0072903 | A1 | 3/2012 | Joukov et al. |
| 2012/0131173 | A1 | 5/2012 | Ferris et al. |
| 2012/0257820 | A1 * | 10/2012 | Sanghvi et al. ............... 382/159 |

FOREIGN PATENT DOCUMENTS

WO    WO2012021324    2/2012

OTHER PUBLICATIONS

Venugopal, Suresh et al., "Effective Migration of Enterprise Applications in Multicore Cloud," Proceedings of the 2011 Fourth IEEE International Conference on Utility and Cloud Computing, 2011, Abstract Only, 1 page, IEEE Computer Society, Washington, DC, USA.

(Continued)

*Primary Examiner* — Camquy Truong
(74) *Attorney, Agent, or Firm* — Ference & Associates LLC

(57) ABSTRACT

Methods and systems for image migration. There are received, at an image reader, files of at least one image of at least one virtual machine from a first environment. Points of variability are identified within the files, with respect to preparation for functioning in a second environment. Each point of variability is associated with corresponding metadata, and each point of variability is stored with its corresponding metadata. The at least one image is reconfigured to function in the second environment, such reconfiguring comprising adjusting the points of variability via using the metadata. The reconfigured image is deployed to the second environment.

18 Claims, 4 Drawing Sheets

(56) References Cited

OTHER PUBLICATIONS

Ward, C. et al., "Workload Migration into Clouds Challenges, Experiences, Opportunities," Proceedings of the 2010 IEEE 3rd International Conference on Cloud Computing, 2010, Abstract Only, 1 page, IEEE Computer Society, Washington, DC, USA.

Paulino, Herve et al., "SmART: An Application Reconfiguration Framework," Complex Systems Design & Management, Proceedings of the First International Conference on Complex System Design & Management CSDM 2010, Abstract, 2010, 3 pages, Springer Berlin Heidelberg, Germany.

* cited by examiner

VIRTUAL MACHINE IMAGE MIGRATION

BACKGROUND

Cloud computing has revolutionized IT service delivery by automating various system management tasks. However, software configuration and integration has remained challenging in the context of migrating applications to cloud computing environments. Because of the diversity of application software and the use of proprietary files and mechanisms needed to obtain information about various operating environments, configuration and integration from an existing source environment (such as a physical server or virtual machine) into a target cloud computing environment has remained complex and expensive.

BRIEF SUMMARY

In summary, one aspect of the invention provides a method of virtual machine image migration, the method comprising the steps of: utilizing a processor to execute computer code configured to perform the steps of: receiving, at an image reader, files of at least one image of at least one virtual machine from a first environment; identifying points of variability within the files, with respect to preparation for functioning in a second environment; associating each point of variability with corresponding metadata; storing each point of variability with its corresponding metadata; reconfiguring the at least one image to function in the second environment, the reconfiguring comprising adjusting the points of variability via using the metadata; and deploying the reconfigured image to the second environment.

Another aspect of the invention provides an apparatus for virtual machine image migration, the apparatus comprising: at least one processor; and a computer readable storage medium having computer readable program code embodied therewith and executable by the at least one processor, the computer readable program code comprising: computer readable program code configured to receive files of at least one image of at least one virtual machine from a first environment; computer readable program code configured to identify points of variability within the files, with respect to preparation for functioning in a second environment; computer readable program code configured to associate each point of variability with corresponding metadata; computer readable program code configured to store each point of variability with its corresponding metadata; computer readable program code configured to reconfigure the at least one image to function in a second environment, the reconfiguring including adjusting the points of variability via using the metadata; and computer readable program code configured to deploy the reconfigured image to the second environment.

An additional aspect of the invention provides a computer program product for virtual machine image migration, the computer program product comprising: a computer readable storage medium having computer readable program code embodied therewith, the computer readable program code comprising: computer readable program code configured to receive files of at least one image of at least one virtual machine from a first environment; computer readable program code configured to identify points of variability within the files, with respect to preparation for functioning in a second environment; computer readable program code configured to associate each point of variability with corresponding metadata; computer readable program code configured to store each point of variability with its corresponding metadata; computer readable program code configured to reconfigure the at least one image to function in a second environment, the reconfiguring including adjusting the points of variability via using the metadata; and computer readable program code configured to deploy the reconfigured image to the second environment.

A further aspect of the invention provides a method comprising: receiving files of at least one image of at least one virtual machine from a first environment; identifying points of variability within the files, with respect to preparation for functioning in a second environment; associating each point of variability with corresponding metadata; storing each point of variability with its corresponding metadata; reconfiguring the at least one image to function in the second environment, the reconfiguring comprising adjusting the points of variability via using the metadata; and subsequently employing the metadata again in migrating the at least one image to a third environment.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
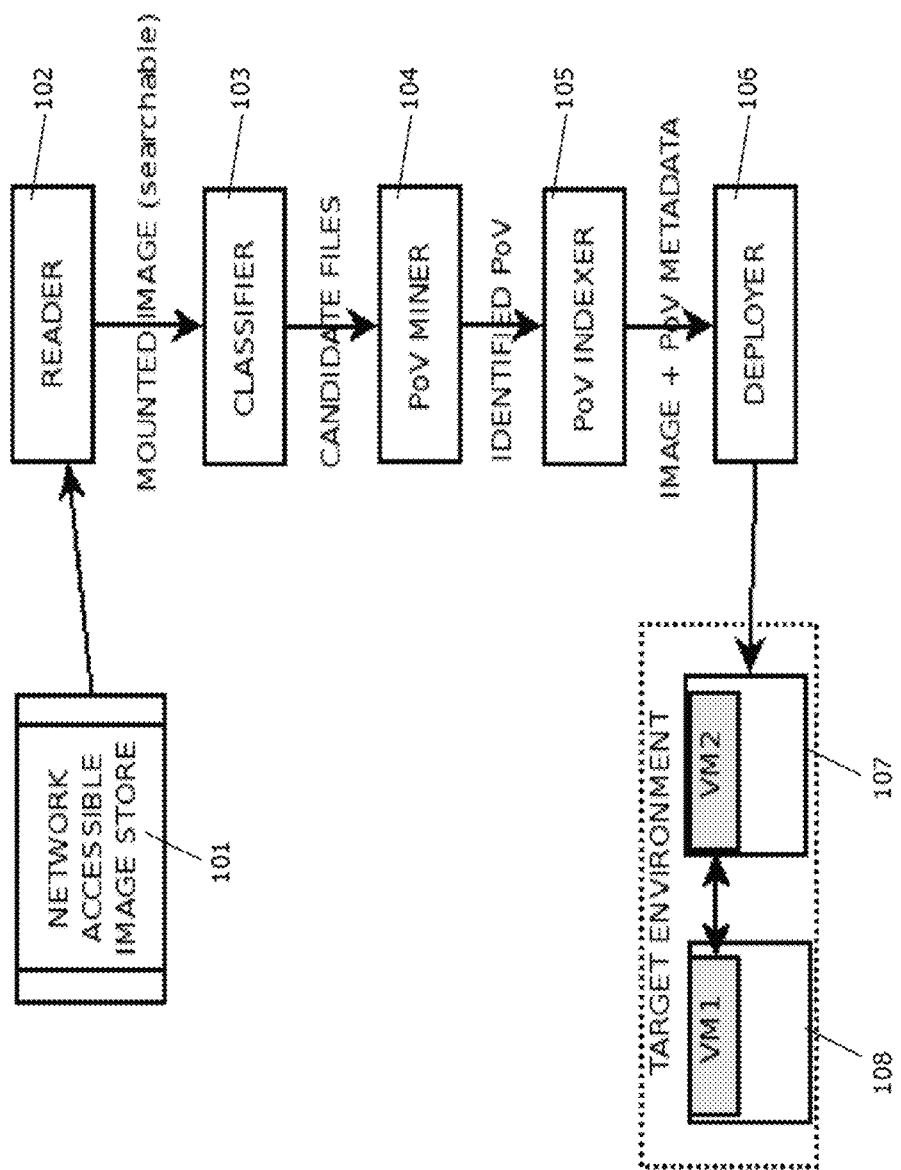
FIG. 1 is a flow chart of an example embodiment.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are described to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention. This disclosure will now begin with a general description of embodiments and then turn to specific non-limiting examples of embodiments with reference to the drawings herein.

A typical data center may contain applications that are installed on virtual machines (VM) or installed on physical servers. Virtual machines are a software implementation of a computing environment in which an operating system or application can be installed and run. One way to migrate from virtual or physical servers into a cloud computing environment is to migrate physical servers into the VM and then migrate the VM into the cloud environment. Another way to accomplish the migration is to create a new VM in the cloud environment and then try to reinstall applications into that new VM. Embodiments provide that either method will require adjustments after the installation to the cloud environment.

Conventionally, migration from one computing environment to another is accomplished using a six step approach. That process is as follows:
 (1) Discovery—for each application, discover the components and their dependencies. For each virtual machine (VM), discover all software installed;
 (2) Analysis—plan a target configuration for each application;
 (3) Migration—migrate the applications to the target environment (using application reinstall or migrating VM images to the target environment);
 (4) Adjustment—for all target VMs, adjust them to operate in the target environment;
 (5) Reconfigure—reconfigure the applications to run in the target environment; and
 (6) Test and Cutoff; continue testing applications until satisfied with operability.

The process of migration from a source environment to a target environment is time-consuming with many manual steps. Embodiments provide that it is possible to automate steps in the process that work at the operating system level, but thus far application-dependent steps for migration have been manual or driven by ad hoc scripts.

Embodiments provide that migration is a change in the environment parameters. Embodiments provide that during the process of migration, the following environment parameters may change: IP addresses, MAC addresses, Hostnames, Port numbers, and Authentication credentials such as private keys and Kerberos tokens, as examples. Embodiments provide that standard tools such as connectivity tools (e.g. SSH [Secure Shell internet protocol] versus "RDP" ["Remote Desktop" protocol from Microsoft Corporation of Redmond, Wash., as non-limiting examples) and system management tools (e.g. "ITM" ["IBM Tivoli Management" from International Business Machines Corporation {IBM} of Armonk, N.Y.] versus "Altiris" [from Symantec Corporation of Mountain View, Calif.] and "TSM" [IBM's "Tivoli Storage Manager"] versus "Veritas Replicator" [from Symantec Corporation], as non-limiting examples), used by the applications may also change during migration (e.g. SSH changes to "RDP", "ITM" replaces "Altiris"). Moreover, embodiments provide that environment standards such as patching standards and security/compliance standards, as non-limiting examples, may also change during migration. Embodiments provide that none of these changing parameters are application specific, but the way they are referenced in proprietary configuration files and mechanisms is specific to each application.

Embodiments provide that the Discovery process (as described in the 6-Step process above) may be replaced with a process that identifies required parameters that will need to be changed in order for an application to function properly after the migration (referred to hereinafter as "points of variability" or "PoVs" interchangeably). Moreover, embodiments describe that a PoV may be used to identify related applications such that if a first VM refers to the IP address of a second VM, they are identified as related and if the IP address of second VM changes during migration, the same address change will be necessary in the first VM to make the related application function. Embodiments further provide that the new PoVs for a given VM are automatically determined by understanding which VM in the environment the PoV belongs to and automatically replacing its new value. Embodiment describe that accurately identifying PoVs is challenging. Values of PoVs may be similar to any other variable or string, for example, host names or port numbers. Moreover, embodiments provide that configuration files contain many inter-dependent PoVs as described below in detail.

Embodiments provide that configuration files may contain PoVs that are dependent on other PoVs. For example, configuration files may contain a port number that depends on a hostname/IP address, a username may depend on a password, or authentication tokens may be present that depend on a hostname/IP address. Embodiments provide that to re-configure these PoVs, a context determination of the dependent PoV with respect to the parent PoV is needed. Embodiments provide that once the context is determined, the dependent PoV is configured accordingly. Embodiments provide that PoV dependency may be mined using an information retrieval technique further provided below.

In one non-limiting example embodiment, the following steps are illustrated. A Reader mounts a source image. A Classifier selects all files in the image that can contain a point of variability (PoV). Given a set of files and a set of PoVs, a Finder will identify all locations on the files containing the PoVs. Dependent PoVs are identified by forming and mining rules that define their contextual relationship. A PoV indexer captures in each image's metadata, the PoV and associated details that can be used to recreate a working application in any new target environment. A deployer takes a set of virtual machine images and their PoV metadata, as well as a target environment's specification, and deploys the application into the target environment by updating all the PoVs.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 4, whether on a server computer, a client computer, a node computer in a distributed network, or any combination thereof.

Figure 2:
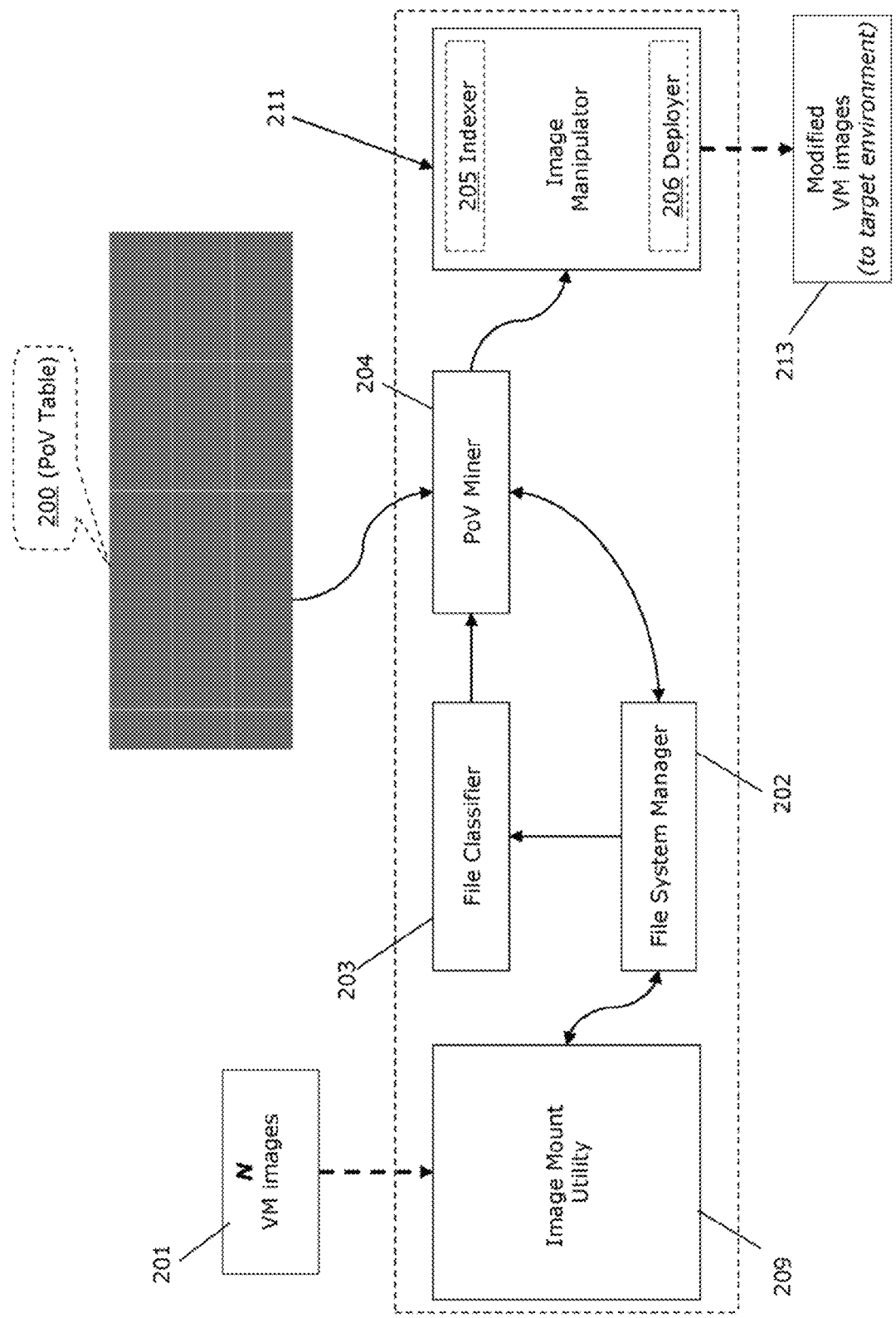
FIG. 2 is a block diagram of an example embodiment.

To facilitate easier reference, in advancing from FIG. 1 to and through FIG. 2, a reference numeral is advanced by a multiple of 100 in indicating a substantially similar or analogous component or element with respect to at least one component or element found in FIG. 1.

Referring now to FIG. 1, a flow chart of an example embodiment is illustrated. For this non-limiting example, it is assumed that all the relevant images are stored in a central location in the image store (101) and these images may be accessed over a network. At 102, the reader is able to access and search the mounted image from the image store. Using the information obtained from reader, the classifier (103) (referred to herethroughout as both "classifier" and "file classifier" interchangeably) identifies, selects and creates a list of files in the image that contain parameters that will need to be changed in order for an application to function properly after the migration, (referred to hereinafter as "points of variability" or "PoVs" interchangeably). Files that are candidates for containing PoVs are passed on to the PoV miner at 104. The PoV miner 104 receives all the files that are candidates for containing PoVs and takes the input as a set of PoVs that should be located in those files. The PoV miner 104 may receive from a discovery module (not shown here) all the values of the variables in the files in the image that will need to change (PoVs) due to the migration.

In accordance with at least one embodiment of the invention, PoV miner 104 will actually identify all the locations in the given set of files that contain the aforementioned PoVs. Embodiments also provide that the PoV miner 104 will search for and identify interdependent PoVs in multiple configuration files and will store that information for later use so that when changes are made to PoVs, they have the appropriate effects on the related and/or interdependent applications and not the other applications being migrated. As such, the PoV miner 104 returns a list of the locations of each PoV. In one non-limiting example of identifying PoVs, if a first file has multiple IP addresses and related port numbers, then the PoV miner 104 will associate the port numbers with the correct respective IP addresses.

In accordance with at least one embodiment of the invention, a PoV indexer 105 (referred throughout the specification as both "PoV indexer" or "indexer" interchangeably) receives the aforementioned list and captures it with the metadata for each of the identified PoVs. The metadata can then later be used to adjust PoVs during subsequent migrations, thus eliminating the need for repeating the whole process leading up to another migration. It will be appreciated that a migration between any two environments may be accomplished, including, for example, a migration between one cloud environment and another cloud environment.

In accordance with at least one embodiment of the invention, a deployer 106 receives the image from the PoV indexer and the list of PoVs (now embedded with the metadata obtained by the PoV miner) and, using the new set of replacement values for the PoVs obtained from an analysis step, deploys the VMs in the target environment (e.g., a VM1 and VM2 as indicated at 107 and 108, respectively) and modifies the values of the PoVs so that the application can function in the target environment.

Referring now to FIG. 2, a block diagram of a non-limiting example, in accordance with at least one embodiment of the invention, is illustrated. As shown, a PoV table (200) is connected to a PoV miner (204). The PoV table (200) provides a list of the PoVs that may be searched for and changed so that the VMs will function in the new target environment. A source environment (201), containing a number N of VM images, is connected to an image mount utility (209). The image mount utility (209) is in communication with a file system manager (202). The image mount utility (209) may comprise a reader which may request and receive each VM image one at a time, mounts the VM image through the file system manager (202) and then exposes the files in that image. The file system manager is in communication with a file classifier (203) and a PoV miner (204). The file classifier (203) and the PoV miner (204) are also in communication with one another.

In the present non-limiting example, in accordance with at least one embodiment of the invention, the file classifier (203) attempts to classify exposed files using various suitable heuristics to identify the files containing the PoVs. For instance, only the files that contain some occurrence of a PoV, as determined by a naïve search method, may be selected for further analysis by the PoV miner (204), or the files that are classified as log files based on the occurrence of string 'log' in the filename or filepath may be rejected directly. This classification process reduces the number of files (and thus the search space) for searching for PoVs. The reduced set of files is then sent to the PoV miner (204). The PoV miner (204) then further searches for the location of the PoVs in each of the files it receives from the file classifier (203). The PoV miner (204) thus further reduces the total number of files to be changed which would subsequently allow the VM to function in the new target environment.

In accordance with at least one embodiment of the invention, the PoV miner (204) is in communication with an image manipulator (211). The image manipulator (211) comprises an indexer 205 and a deployer 206, both of which may function similarly to those described and illustrated with respect to FIG. 1 (at 105 and 106, respectively). As such, the indexer 205 receives a list of PoVs created and identified by the PoV miner, and captures that list along with the metadata for the PoVs. This information is then passed along by the image manipulator (211). More particularly, the deployer 206 takes the image and list of PoVs embedded in the image by the PoV indexer 205, combines that information with the new set of values that might be obtained during analysis and combines the information allowing the replacement values for the PoVs to be substituted and modifying the image where necessary. Finally, the image manipulator uploads the modified VM Images 213 to a target environment.

In accordance with at least one embodiment of the invention, a PoV miner (e.g., as indicated at 204 in FIG. 2 and/or at 104 in FIG. 1) may function as follows. For each PoV value, such as a hostname or an IP address or a username, the PoV miner traverses an AST (abstract syntax tree representation) of a file of an image to identify and verify a location of the PoV value in the file by annotating nodes in the AST. Each node in the AST represents some text in the respective configuration file. The annotations help in verifying whether the identified node is a hostname or an IP address or a username. The nodes in the AST are annotated using value-based rules, structure-based rules, relationship-based rules or any combination thereof. Each rule establishes directed connection between annotations of nodes in the AST and has an associated probability. A confidence in an annotation of a node is calculated by composing the probabilities associated with respective rules that resulted in the annotation and performing a graph-based traversal of the connections between annotations of nodes. The confidence in an annotation of a node may be "intrinsic" as determined by value-based or structure-based rules or any combination thereof, or the confidence may be "relationship-based" as determined by relationship-based rules that identify the context of a dependent PoV value with respect to its associated parent PoV value as described below.

In accordance with at least one embodiment of the invention, a PoV miner (e.g., as indicated at 204 in FIG. 2 and/or at 104 in FIG. 1) comprises a "PoV relationship miner" which may function as follows, using relationship-based rules. For each dependent PoV value, such as a port number, and its associated parent PoV value, such as a hostname, the PoV miner module establishes the relationship between annotations of two respective nodes N1 and N2 in an AST of a file when the following conditions are satisfied. Assume without loss of generality that the value of N1 corresponds to the dependent PoV where N1 has been annotated appropriately, and the value of N2 corresponds to the parent PoV where N2 has also been annotated appropriately. Then, the PoV relationship miner uses relationship-based rules to identify the relationship between the respective annotations of N1 and N2 and associate a confidence with this relationship which is calculated using the "distance" between nodes N1 and N2 in the AST. The "distance" may be calculated using the graph-distance between nodes N1 and N2 in the AST, other measures of distance such as distance between key strings associated with the values in nodes N1 and N2, or any combination thereof. At the end of AST traversal, the locations of PoV values and relationship between dependent PoVs and parent PoVs are confirmed using "intrinsic" and "relationship-based" confidence values associated with annotations either automatically or under human supervision or any combination thereof.

It will be appreciated by those skilled in the relevant art that embodiments provided may be applied for discovering performance parameters for a given application or computing environment. Other uses will be apparent to those skilled in the art and embodiments contemplate all of these.

Figure 3:
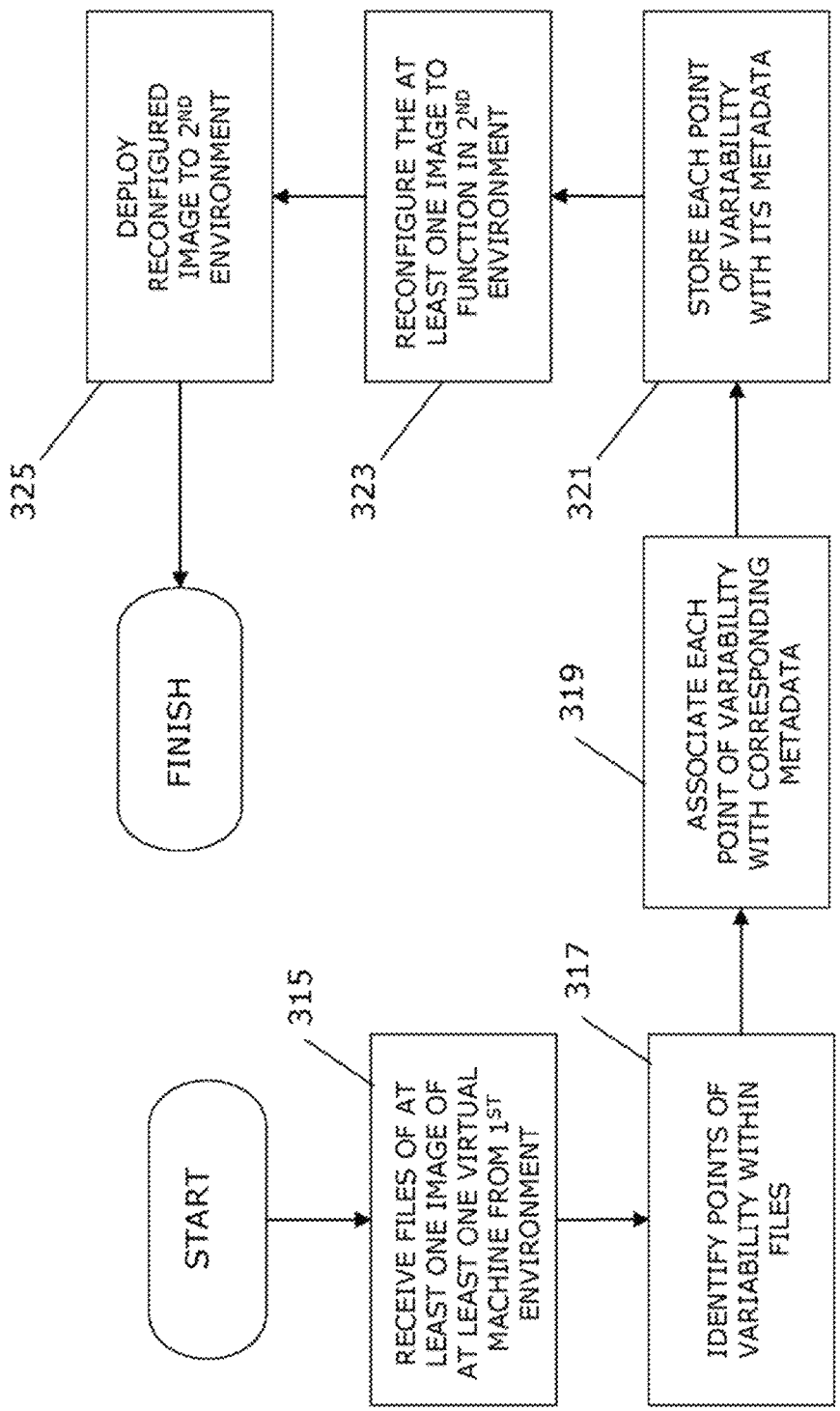
FIG. 3 sets forth a process more generally for image migration.

FIG. 3 sets forth a process more generally for image migration, in accordance with at least one embodiment of the invention. It should be appreciated that a process such as that broadly illustrated in FIG. 3 can be carried out on essentially any suitable computer system or set of computer systems, which may, by way of an illustrative and non-restrictive example, include a system such as that indicated at 12' in FIG. 4. In accordance with an example embodiment, most if not all of the process steps discussed with respect to FIG. 3 can be performed by way of a processing unit or units and system memory such as those indicated, respectively, at 16' and 28' in FIG. 4.

As shown in FIG. 3, in accordance with at least one embodiment of the invention, there are received, at an image reader, files of at least one image of at least one virtual machine from a first environment (315). Points of variability are identified within the files, with respect to preparation for functioning in a second environment (317). Each point of variability is associated with corresponding metadata (319), and each point of variability is stored with its corresponding metadata (321). The at least one image is reconfigured to function in the second environment, such reconfiguring comprising adjusting the points of variability via using the metadata (323). The reconfigured image is deployed to the second environment (325).

Figure 4:
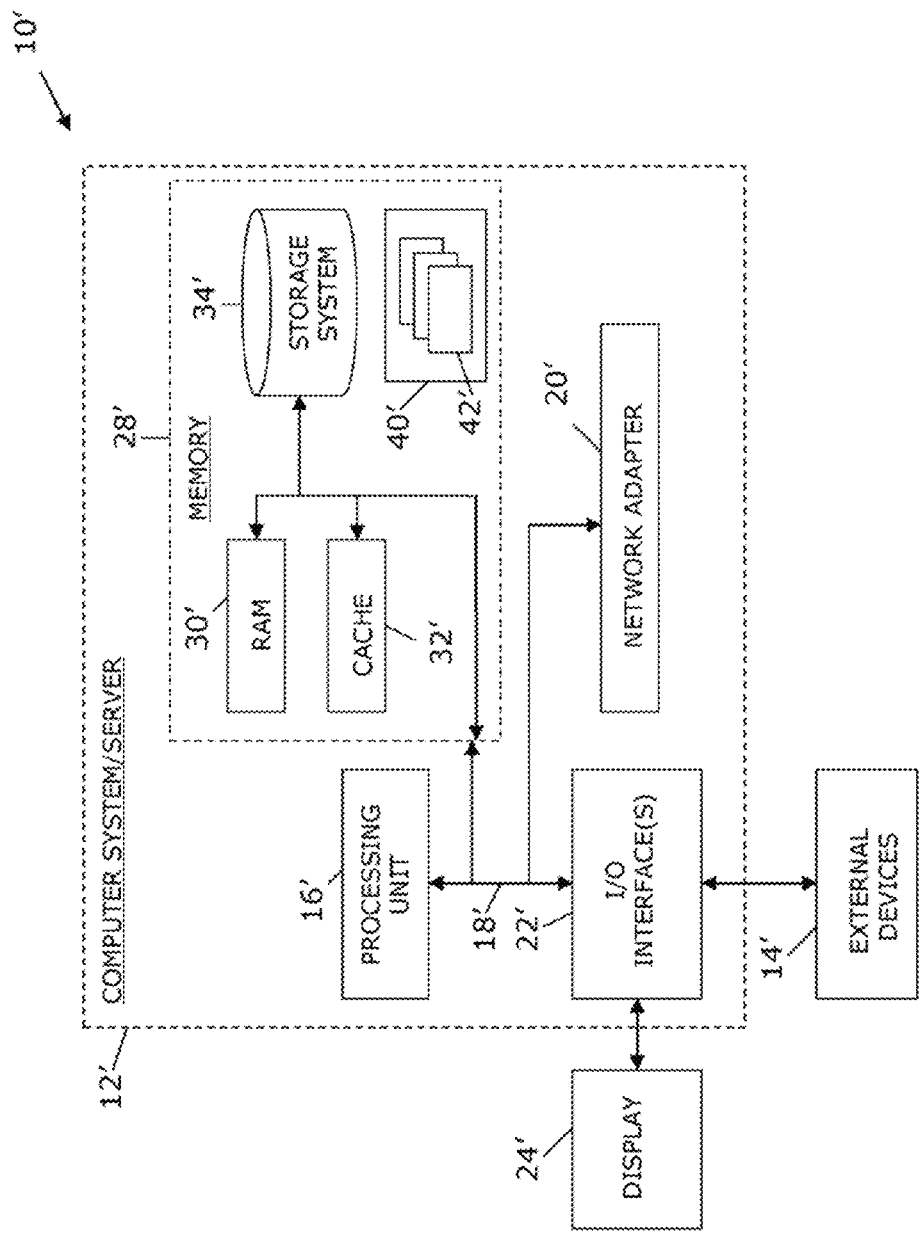
FIG. 4 illustrates a computer system.

Referring now to FIG. 4, a schematic of an example of a cloud computing node is shown. Cloud computing node 10' is only one example of a suitable cloud computing node and is not intended to suggest any limitation as to the scope of use or functionality of embodiments of the invention provided herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be provided in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are provided herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and provided in order to explain principles and practical application, and to enable others of ordinary skill in the art to understand the disclosure.

Although illustrative embodiments of the invention have been provided herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of virtual machine image migration, said method comprising the steps of:
    utilizing a processor to execute computer code configured to perform the steps of:
    receiving, at an image reader, files of at least one image of at least one virtual machine from a first environment;
    identifying points of variability within the files, with respect to preparation for functioning in a second environment, wherein the points of variability comprise elements which change during virtual machine migration;
    associating each point of variability with corresponding metadata;
    storing each point of variability with its corresponding metadata;
    reconfiguring the at least one image to function in the second environment, said reconfiguring comprising adjusting the points of variability via using the metadata; and
    deploying the reconfigured image to the second environment.

2. The method according to claim 1, wherein the second environment comprises a target virtual machine environment.

3. The method of claim 1, wherein:
    the at least one virtual machine from a first environment comprises a first virtual machine and a second virtual machine; and
    said method comprises classifying the first and second virtual machines as related virtual machines in response to discovering at least one identical point of variability between the first and second virtual machines.

4. The method according to claim 3, wherein said adjusting comprises adjusting the at least one identical point of variability to an identical value among the first and second virtual machines.

5. The method according to claim 1, wherein said identifying comprises classifying the files based on a capability to include a point of variability.

6. The method according to claim 1, wherein said storing comprises indexing the metadata.

7. The method according to claim 1, wherein the points of variability comprise at least one member selected from the group consisting of: at least one environment parameter; at least one standard tool; and at least one standard.

8. The method according to claim 1, wherein said identifying comprises:
    identifying at least one point of variability which is dependent on at least one other point of variability; and
    determining a context of dependency between the at least one point of variability and the at least one other point of variability.

9. The method according to claim 8, wherein said identifying of at least one point of variability comprises identifying points of variability based on rules that associate an annotation with a text in a file in an image.

10. The method according to claim 9, wherein the rules comprise at least one of: value-based rules; structure-based rules; relationship-based rules; and hybrid rules.

11. The method according to claim 9, wherein:
    each rule includes an associated probability; and
    said method comprises performing graph-based traversal for calculating confidence in an annotation using a composition of two or more rules, wherein confidence associated with an annotation is at least one of: intrinsic; and relationship-based.

12. An apparatus for virtual machine image migration, said apparatus comprising:
    at least one processor; and
    a computer readable storage medium having computer readable program code embodied therewith and executable by the at least one processor, the computer readable program code comprising:
    computer readable program code configured to receive files of at least one image of at least one virtual machine from a first environment;
    computer readable program code configured to identify points of variability within the files, with respect to preparation for functioning in a second environment wherein the points of variability comprise elements which change during virtual machine migration;
    computer readable program code configured to associate each point of variability with corresponding metadata;
    computer readable program code configured to store each point of variability with its corresponding metadata;
    computer readable program code configured to reconfigure the at least one image to function in a second environment, the reconfiguring including adjusting the points of variability via using the metadata; and
    computer readable program code configured to deploy the reconfigured image to the second environment.

13. A computer program product for virtual machine image migration, said computer program product comprising:
    a computer readable storage medium having computer readable program code embodied therewith, the computer readable program code comprising:
    computer readable program code configured to receive files of at least one image of at least one virtual machine from a first environment;
    computer readable program code configured to identify points of variability within the files, with respect to preparation for functioning in a second environment wherein the points of variability comprise elements which change during virtual machine migration;
    computer readable program code configured to associate each point of variability with corresponding metadata;
    computer readable program code configured to store each point of variability with its corresponding metadata;
    computer readable program code configured to reconfigure the at least one image to function in a second environment, the reconfiguring including adjusting the points of variability via using the metadata; and
    computer readable program code configured to deploy the reconfigured image to the second environment.

14. The computer program product according to claim 13, wherein the second environment comprises a target virtual machine environment.

15. The computer program product of claim 13, wherein:
the at least one virtual machine from a first environment comprises a first virtual machine and a second virtual machine; and
said computer readable program code is configured to classify the first and second virtual machines as related virtual machines in response to discovering at least one identical point of variability between the first and second virtual machines.

16. The computer program product according to claim 13, wherein said computer readable program code is configured to classify the files based on a capability to include a point of variability.

17. The computer program product according to claim 13, wherein said computer readable program code is configured to index the metadata.

18. A method comprising:
receiving files of at least one image of at least one virtual machine from a first environment;
identifying points of variability within the files, with respect to preparation for functioning in a second environment, wherein the points of variability comprise elements which change during virtual machine migration;
associating each point of variability with corresponding metadata;
storing each point of variability with its corresponding metadata;
reconfiguring the at least one image to function in the second environment, said reconfiguring comprising adjusting the points of variability via using the metadata; and
subsequently employing the metadata again in migrating the at least one image to a third environment.

\* \* \* \* \*